Feb. 26, 1963 R. W. BOGLE ET AL 3,079,564
HOT CATHODE VIDEO DETECTOR
Filed Sept. 2, 1960
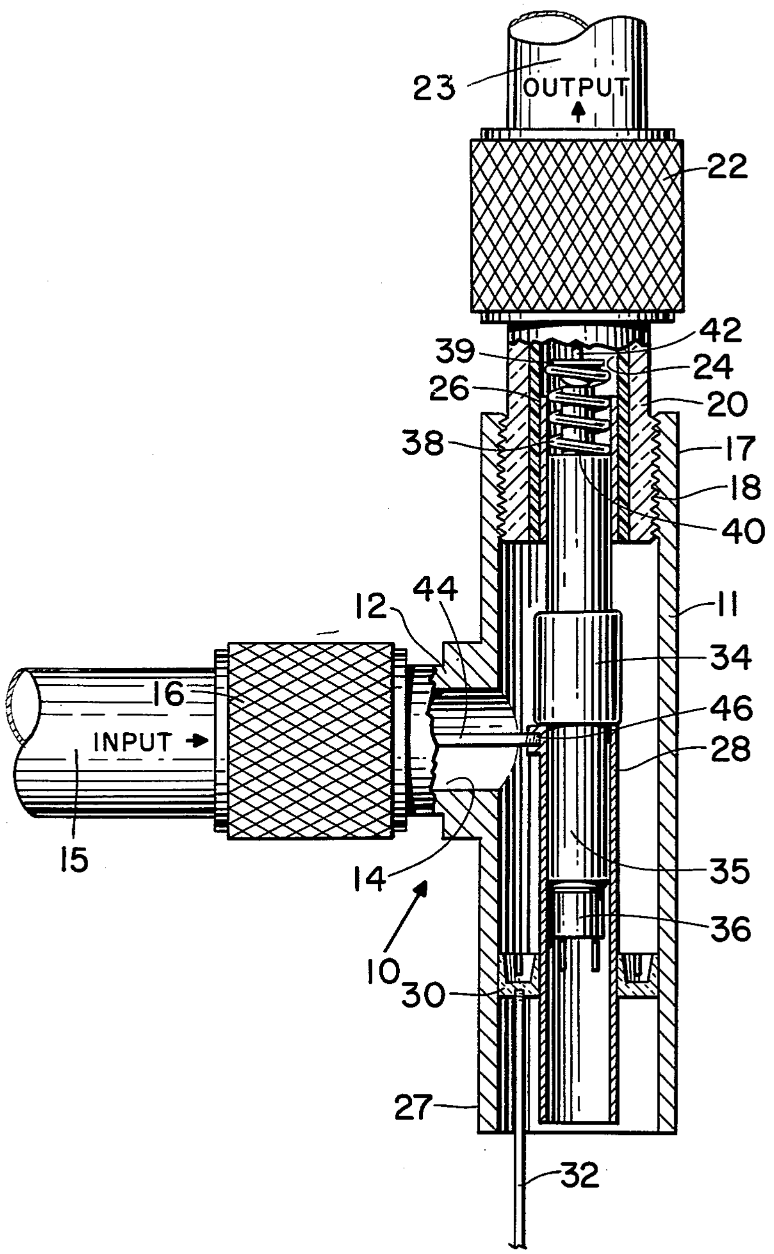
ROBERT W. BOGLE
JOHN W. KIEBLER
*INVENTORS*
*BY* J. M. St. Amand
*ATTORNEYS*

United States Patent Office 3,079,564
Patented Feb. 26, 1963

3,079,564
HOT CATHODE VIDEO DETECTOR

Robert W. Bogle, Santa Barbara, Calif., and John W. Kiebler, Takoma Park, Md., assignors to the United States of America as represented by the Secretary of the Navy Filed Sept. 2, 1960, Ser. No. 53,856
8 Claims. (Cl. 329—162)
(Granted under Title 35, U.S. Code (1952), sec. 266)

The invention herein described may be manufactured and used by or for the Government of the United States of America for governmental purposes without the payment of any royalties thereon or therefor.

The present invention relates to detectors for use in ultra-high frequency receiving apparatus and the like, and more particularly to a video detector utilizing a hot-cathode diode.

Previous video detectors employed crystal diodes; these video detectors had inadequate output without amplification due to crystal burnout. The present invention eliminates the need for crystal diodes in video detectors and reduces amplification requirements. The present invention also permits higher video output pulse amplitudes with resulting reduced demands upon the video amplifier of a system and uses a pencil-shaped ultra-high-frequency thermionic diode whose coaxial-electrode structure permits an efficient mounting arrangement within a cylindrical section of waveguide. The video detector of this invention permits load or damping demands upon the RF oscillator of a system to be localized within the video element itself thereby improving the system stability.

It is an object of the invention, therefore, to provide a novel video detector for use in ultra-high frequency receiving apparatus.

It is also an object of the invention to provide an improved video detector permitting higher video output pulse amplitudes without the use of crystals.

It is another object of the invention to provide an improved video detector which provides improved system stability in ultra-high frequency apparatus.

It is a further object of the invention to provide a video detector utilizing a hot-cathode diode which permits load or damping demands upon the RF oscillator of a system to be localized within the video element.

Other objects and many of the attendant advantages of this invention will become readily appreciated as the same becomes better understood by reference to the following detailed description when considered in connection with the accompanying drawing wherein:

The FIGURE of the drawing is a view of a preferred embodiment of the invention shown partially in cross-section.

As illustrated in the drawing, the video detector of the present invention has a body of general T-shaped configuration 10 consisting of cylindrical tubular portion 11 having an input branch 12 with a cylindrical passage 14 therethrough protruding from one side thereof to which is attached a first coaxial connector 16 for connection of the detector with a coaxial waveguide 15. One end 17 of tubular portion 11 is threaded internally at 18 and has threaded therein a plug portion 20 to which is attached a second coaxial connector 22 forming an output branch for connection with a coaxial waveguide 23. Plug 20 has a cylindrical passage 24 therethrough and has an RF by-pass capacitor 26 which fits therein. The other end 27 of tubular portion 11 contains a cathode contact slevee 28 located coaxially therewith and a tuning plunger 30 in the form of an annular ring having flanges which surrounds cathode contact sleeve 28 and slidingly fits against the inner side of end 27 of tubular portion 11 forming a tunable cavity branch. Plunger 30 has a rod 32 attached thereto as a means for moving the plunger within the tunable cavity in end 27.

An ultra-high-frequency thermionic diode 34 has its cathode end 35 fitting within one end of cathode contact sleeve 28 in contact with a pencil-type tube socket 36. The other end of diode 34 fits within the cylindrical passage 24 in plug 20 and is surrounded by RF by-pass capacitor 26. Contact spring 38 and button 39 engage the anode end 40 of the thermionic diode and electrically connect with RF output contact 42 in the output branch. RF input contact 44 is threadedly connected at 46 to cathode contact sleeve 28. The entire assembly forms a hard-diode RF envelope detector.

An RF input is supplied from a video loop or antenna to the detector 10 through coaxial connector 16 and RF input contact 44. RF energy is conducted to the detector cathode through contact 44. Tuning plunger 30 in the tunable cavity 27 gives a smooth variation with plunger motion and permits tuning to maximize the output signal. The output of the detector may be connected to an amplifier through coaxial connector 22 and will provide higher video output pulse amplitudes with resulting reduced demands upon a video amplifier system.

Obviously many modifications and variations of the present invention are possible in the light of the above teachings. It is therefore to be understood that within the scope of the appended claims the invention may be practiced otherwise than as specifically described.

What is claimed is:

1. In an ultra-high frequency receiving apparatus, a hard-diode RF envelope detector including a T-shaped body having an input branch, a tunable cavity branch and an output branch, a cathode contact sleeve in the cavity branch, a tuning plunger in the cavity branch which surrounds the cathode contact sleeve and slidingly fits against and in contact with said cathode contact sleeve and the inner wall of said tunable cavity branch, said tuning plunger being operable to be moved along the entire length of said tunable cavity branch to vary the size of the cavity therein, a thermionic diode in said cavity and output branches having a cathode received in said cathode contact sleeve, means in said output branch for engaging the anode of said diode, and means in the input branch engaging said cathode contact sleeve for conducting radio frequency energy from a waveguide to the cathode.

2. In ultra-high frequency receiving apparatus as in claim 1, a by-pass capacitor in the output branch, and an output coaxial plug, said by-pass capacitor being mounted between the plug and the anode of the diode.

3. A video detector for use in ultra-high frequency receiving apparatus comprising a T-shaped coaxial cylindrical tubular body for connection with coaxial waveguide having an input branch forming the stem of the T-shaped body, a coaxial waveguide connects to said input branch, a tunable cavity branch and an output branch forming the cross-bar of the T-shaped body, a thermionic diode in said tunable cavity and output branches, a cathode contact sleeve positioned coaxially within said cavity branch and having the cathode end of said diode received in said cathode contact sleeve, a tuning means in said cavity branch comprising a ring-shaped tuning plunger which surrounds said cathode contact sleeve and slidingly fits against and in contact with said cathode contact sleeve and the inner wall of said cavity branch, said tuning plunger operable to be moved along the entire length of said tunable cavity branch for varying the size of the cavity therein, means in said output branch for engaging the anode end of said diode, and means in said input branch for engaging said cathode contact sleeve and conducting radio frequency energy from said coaxial waveguide to the cathode of said diode.

4. A video detector as in claim 3 wherein said means for engaging the anode of said diode comprises a spring and contact button in said output branch.

5. A video detector as in claim 3 wherein said thermionic diode has a coaxial-electrode structure.

6. A video detector for use in ultra-high frequency receiving apparatus comprising a T-shaped tubular body having an input branch, a tunable cavity branch and an output branch, a thermionic diode in said tubular body, a cathode contact sleeve positioned coaxially within said cavity branch and having the cathode of said diode received in said cathode contact sleeve, a tuning means in said cavity branch surrounding said cathode contact sleeve and operable to be moved along the entire length of said cathode contact sleeve, said tuning means consisting of a tuning plunger which fits slidingly against and in contact with said cathode contact sleeve and the inner wall of said tunable cavity branch, said plunger being movable for the purpose of varying the size of the cavity in said cavity branch for tuning the detector to maximum output signal, means in said input branch for engaging said cathode contact sleeve and conducting radio frequency energy from waveguide means to the cathode of said diode.

7. A video detector as in claim 6 wherein said input and output branches have coaxial type connectors for connection with coaxial waveguides.

8. A video detector as in claim 6 wherein a by-pass capacitor is mounted in said output branch between the anode of said diode and output of said branch.

References Cited in the file of this patent

UNITED STATES PATENTS

| | | |
|---|---|---|
| 2,406,277 | Bondley | Aug. 20, 1946 |
| 2,481,171 | Spencer | Sept. 6, 1949 |
| 2,506,644 | Johnson | May 9, 1950 |